Figure 1:
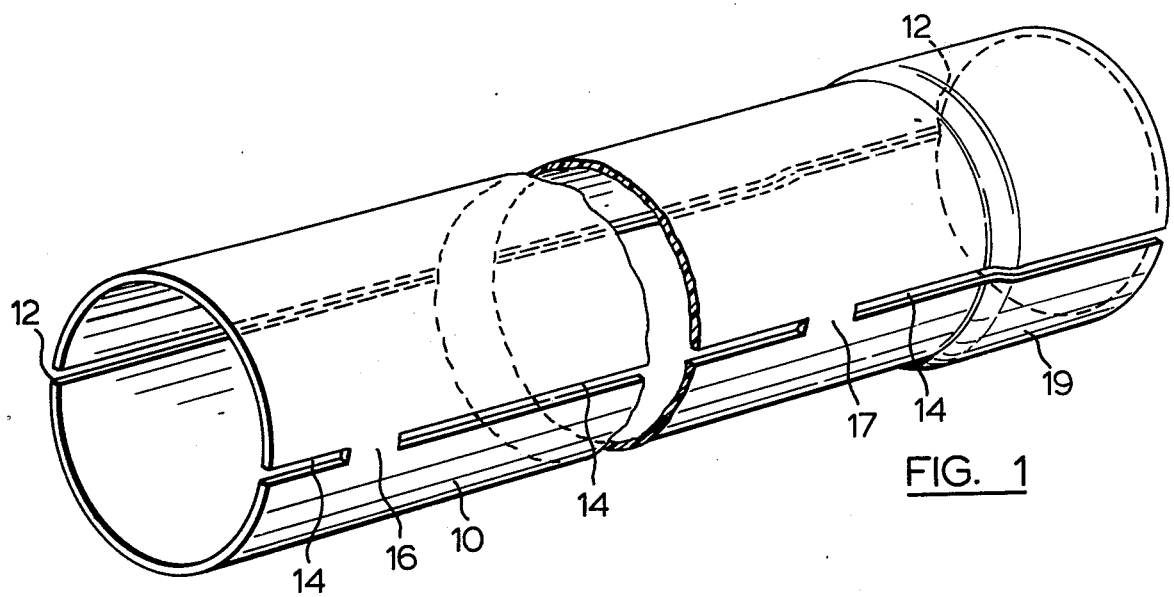

United States Patent

Sack

[11] 4,175,593
[45] Nov. 27, 1979

[54] SPLIT DUCT WITH INTEGRAL HINGE

[75] Inventor: Stanley F. Sack, St. Andrews East, Canada

[73] Assignee: Canadian General Electric Company Limited, Toronto, Canada

[21] Appl. No.: 755,109

[22] Filed: Dec. 28, 1976

[51] Int. Cl.² .............................................. F16L 57/00
[52] U.S. Cl. ..................................... 138/110; 16/150; 138/99; 138/177; 174/68 C; 285/419
[58] Field of Search ................. 138/99, 177, 156, 158, 138/96 T, 128, 110; 16/150; 285/419; 174/68 C

[56] References Cited

U.S. PATENT DOCUMENTS

| | | | |
|---|---|---|---|
| 2,292,176 | 8/1942 | Tate | 16/150 |
| 2,594,838 | 4/1952 | Alexander et al. | 138/DIG. 2 |
| 2,653,887 | 9/1953 | Slayter | 138/DIG. 2 |
| 3,002,534 | 10/1961 | Noland | 138/DIG. 2 |
| 3,191,632 | 6/1965 | Keiding | 138/156 |
| 3,203,653 | 8/1965 | Hall | 137/177 X |
| 3,711,632 | 1/1973 | Ghirardi | 285/419 |

Primary Examiner—William D. Martin, Jr.
Attorney, Agent, or Firm—Raymond A. Eckersley

[57] ABSTRACT

Ducting particularly suited for placement over an existing cable run comprises a tubular duct, for example glass filament wound epoxy duct, the wall of which is slit along the length thereof. Opposed to the slit the wall is weakened e.g. by perforating to form integral hinges upon which the duct may be hinged open for the introduction of the cable therein.

11 Claims, 3 Drawing Figures

SPLIT DUCT WITH INTEGRAL HINGE

This invention is concerned with service installations of power and signal distribution cable or the like; it is particularly concerned with ducting suitable for use therewith.

In service installations of the above type it is upon occasion necessary to replace the ducting protecting an existing cable run. Hitherto it is believed that such replacement has been effected by the use of ducting which is longitudinally split into two separate halves. To install the duct, the two halves must be separately placed about the cable and manually retained until they are at least temporarily secured together. This method of installation is both tedious and slow, additionally due to the exigencies both of the manufacturing processes and of the method of installation, it is found to be difficult to maintain the register of circumferential mating portions and of axial end mating portions of the duct halves, hence the task of sealing the duct subsequent to its installation is time concuming and the results are not wholly satisfactory.

My invention contemplates a duct which has been found to be more suitable for use in the above installations whereby the difficulties earlier experienced may be largely overcome. Briefly expressed, a duct constructed in accordance with my invention comprises a tube made from a resilient plastic material, the wall of which is axially slit along the length thereof. The wall of the tube duct generally radially opposed to the slit is weakened sufficiently so as to form an integral hinge whereby the tube duct may be resiliently hinged open for the introduction of the cable therein, and the tube duct then snapped in position to surround the cable. The materials from which the resilient tube duct of my invention may be manufactured are as a class plastic resins. Suitable resins are presently employed for making integrally walled tube duct and also the separately halved duct referred to above. Amongst these resins may be particularly mentioned thermoplastic resins such as polyvinyl chloride, polyethylene and polypropylene, which resins may be reinforced, for example with glass or other fibers. Certain fiber reinforced thermosetting resins may also be employed such as polyester resins or epoxy resins.

The precise manner in which the wall of the tube duct is weakened to form the integral hinge will depend largely upon the material from which the duct is constructed. Where certain of the thermoplastic materials are employed, their modulus of elasticity may be relatively low, and the wall of a duct constructed from these materials may be continuously grooved to weaken it along the length thereof. Tube duct made from these materials is commonly extruded, hence the duct of my invention may be formed with both an axial slit and a continuous groove opposed thereto in a single extruding operation. As an alternative, integrally walled tube duct may be sawn or otherwise slit lengthwise and the integral hinge formed by grooving the wall by hot pressing or rolling for example. Where materials such as the glass filament reinforced thermosetting plastics are employed their elastic modulus may be relatively high generally, and the force necessary to hinge open a duct sufficiently for the cable to be introduced is generally much greater than can be generated manually even when the wall of the duct is deeply grooved. A preferred manner of weakening the wall under these circumstances to form the integral hinge is to perforate the wall. In a pipe duct of the helically wound glass filament reinforced epoxy resin type constructed, for example, in accordance with the method disclosed in Canadian Pat. No. 1,025,904 issued Feb. 7, 1978 to Buehler et al, commonly assigned herewith, I find that a plurality of collinear axially aligned slots can be cut into the wall of the duct to occupy from about 90 to 99% of the length thereof, leaving some 10 to 1% to function as the hinge. Typically in a duct having a length of 20 ft., the total axial length of the hinge sections may be only some 3 to 6 inches. Desirably on long duct lengths the total hinge length is divided into two or more parts whereby the duct halves may be retained more readily in parallel relationship. However where duct couplings and fittings are integrally hinged, such parts are normally of limited axial extent and a single hinge usually suffices.

Figure 2:
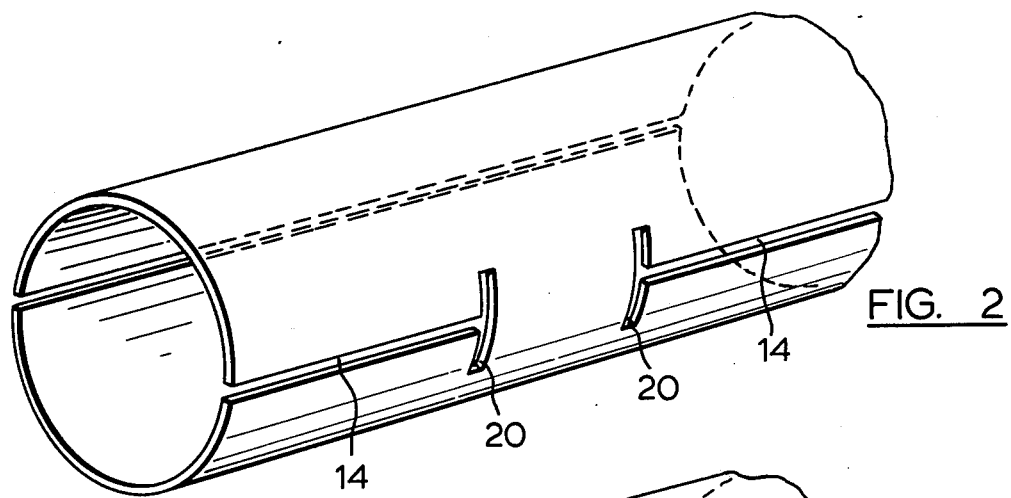
Figure 3:
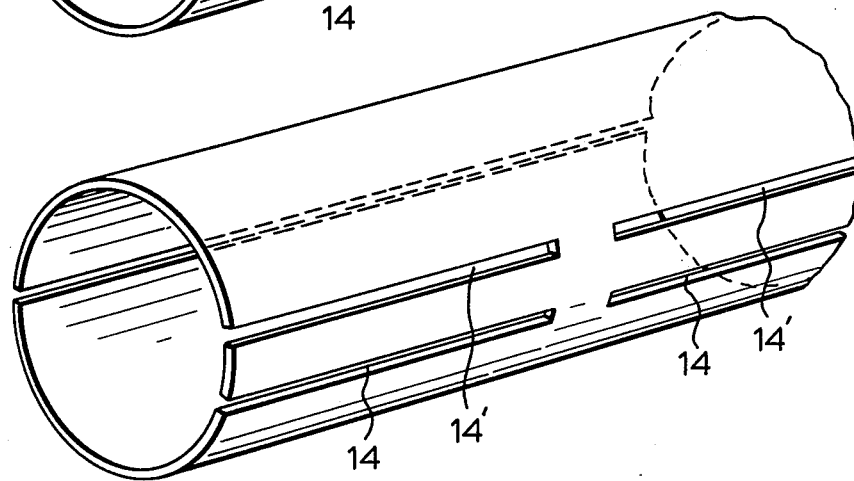

My invention will be further described with reference to the accompanying drawings, which show:

In FIG. 1, a tube duct in perspective view constructed in accordance with my invention and seen from the hinged side;

In FIGS. 2 and 3, parts of a tube duct also in perspective and seen from the hinged side, with modified hinge structures.

Referring now to FIG. 1, a tube duct which is indicated generally by the numeral 10 comprises an axially elongated, generally cylindrical tube which may typically have a length of up to 20 feet. The embodiment illustrated is constructed of glass filament reinforced epoxy resin; for general details of the construction reference may be had to the aforementioned Buchler et al patent. Duct 10 is axially slit along the length thereof at 12, which operation may be carried out by sawing, for example, or by abrading. Radially opposed to slit 12 the wall of duct 10 is weakened by slots of perforations 14, leaving sections 16 and 17 which form resilient integral hinges whereby the two halves of pipe duct 10 are interconnected. Slots 14 may be formed in the wall of duct 10 in the same manner as the duct is slit at 12, e.g. by sawing. The width of slots 14 is not critical, and in general the saw kerf formed by a heavy duty carbide tipped blade, approximately 0.25 inch, may be adequate. When the halves of duct 10 are hinged open for the introduction of a cable therein, a considerable stress is imposed locally in the hinge areas of the reinforced duct, and as a consequence the areas may be strained considerably beyond their elastic limit. It is desirable to retain a sufficient integrity of the hinge areas such that duct 10 will snap shut subsequent to the introduction of a cable therein, thus ensuring a proper register of the opposed edges of slit 12. The strain experienced by the hinge areas 16 and 17 may be reduced by further weakening the wall of duct 10, for example by increasing the width of slots 14. An alternative method contemplated by my invention and illustrated in FIG. 2, is by forming transverse slots 20 which intersect slots 14 at the closed ends thereof. A still further alternative, as illustrated in FIG. 3 is to form two or more radially spaced apart axial slots 14, 14'. Other methods of weakening the wall of duct 10 and delocalizing the imposed stress forces in the region of the integral hinges will be apparent to those skilled in the art.

The axial extent and location of integral hinges 16 and 17 along duct 10 is not critical. Assuming duct 10 to have an extended length, i.e. from about 4 to 20 feet, such as may be employed in commercial duct systems, it is generally preferred to locate each hinge with about 10 to 25 percent of the length of the duct from the ends thereof. A third or more hinge or hinges intermediate hinges 16 and 17 may be found to be desirable particularly where duct 10 has a length some 20 feet. The axial extent of the hinges will depend upon the materials and manner of construction of the duct 10 and the method of delocalizing stress forces in the vicinity of the hinge. For the simple hinge structure shown in FIG. 1, the axial extent of each hinge may be in the range of about 1 to 4 inches depending upon the wall thickness and diameter of duct 10. In general the combined axial extent of the hinge sections is approximately in the range 1 to 10 percent of the axial length of the duct, or as a corollary, the weakening slots 14 occupy approximately 90 to 99 percent of the axial length of the duct. When the duct is of smaller axial extent e.g. in the range of about 1 to 4 feet, a single hinge will normally suffice and provide adequate register of the mating edges of slit 12.

Where the duct is linear and of constant radial cross section, the number and placement of the hinge areas will be guided by the above considerations. Where the duct is not linear, and or where the radial cross section changes, the hinge placement will be guided by the desirability of the hinges being recticollinear. Thus, in the duct 10 of FIG. 1 which is shown as having a bell mouth end 19, hinge 17 provided at that end of the duct will not normally locate on the bell mouth but will be adjacent thereto, and one slot 14 will normally extend continuously through the bell mouth end. It will be apparent that provision must be made to permit areas of the bell mouth 19 located along the hinge line to move towards each other as the duct is hinged open. The wall thickness of duct 10 constructed accordingly to the aforesaid Buehler patent is normally not greater than about 0.1 inch, hence the difference in external diameter of the bell mouth 19 and the spigot end 21 of the duct is usually not greater than about 0.25 inches. Whilst the width of slot 14 may be specifically adjusted where it passes through bell mouth 19, the normal method of formation of slot 14 by sawing or abrading as earlier described usually provides an adequate clearance between the opposed surfaces of slot 14 in this area for the purpose described.

Whilst my invention has been particularly described with respect to a preferred embodiment thereof, such embodiment is not to be taken as being limiting but merely as being illustrative of my invention. A wide range of resilient plastic materials may be utilized within the scope of my invention and and the precise means by which the wall of the duct is weakened to form the integral hinge structure will depend upon the known physical properties of the materials employed. The scope of the invention is to be taken according to the spirit of the appended claims.

The embodiments of the invention in which an exclusive property or privilege is claimed are defined as follows:

1. A tubular duct suitable for installation upon an existing cable run, said duct being axially elongated and constructed from a resilient self supporting glass fiber reinforced plastic material and characterized by a first wall portion thereof being axially slit along the length of said duct, and a second wall portion generally radially opposed to said first wall portion being weakened by providing therein at least three axially aligned slots extending along about 90 to 99 percent of the axial length of said duct to form a pair of spaced apart integral hinges whereby said duct may be resiliently opened along the length thereof to permit the introduction of said cable therein through said slit.

2. A tubular duct as described in claim 1 wherein said duct has a bell mouth end and wherein one said slot is formed continuously in said bell mouth to extend at least the axial extent thereof.

3. A tubular duct as described in claim 1 wherein said wall is further weakened by transverse slots which intersect said axial slots at the closed ends thereof.

4. A tubular duct as described in claim 1 wherein said wall is perforated by at least two radially spaced slots.

5. A tubular duct as defined in claim 1 wherein said plastic material is a thermosetting resin.

6. A tubular duct as defined in claim 1 wherein said glass fiber reinforced plastic material is a glass filament wound epoxy resin.

7. A tubular duct as defined in claim 1 wherein said duct is formed from a thermoplastic material.

8. A tubular duct as defined by claim 2 wherein said duct is formed from a glass filament reinforced thermosetting resin.

9. A tubular duct as defined by claim 3 wherein said duct is formed from a glass filament reinforced thermosetting resin.

10. A tubular duct as defined by claim 2 wherein said duct is formed from a glass filament wound reinforced epoxy resin.

11. A tubular duct as defined by claim 3 wherein said duct is formed from a glass filament wound reinforced epoxy resin.

* * * * *